Figure 7:
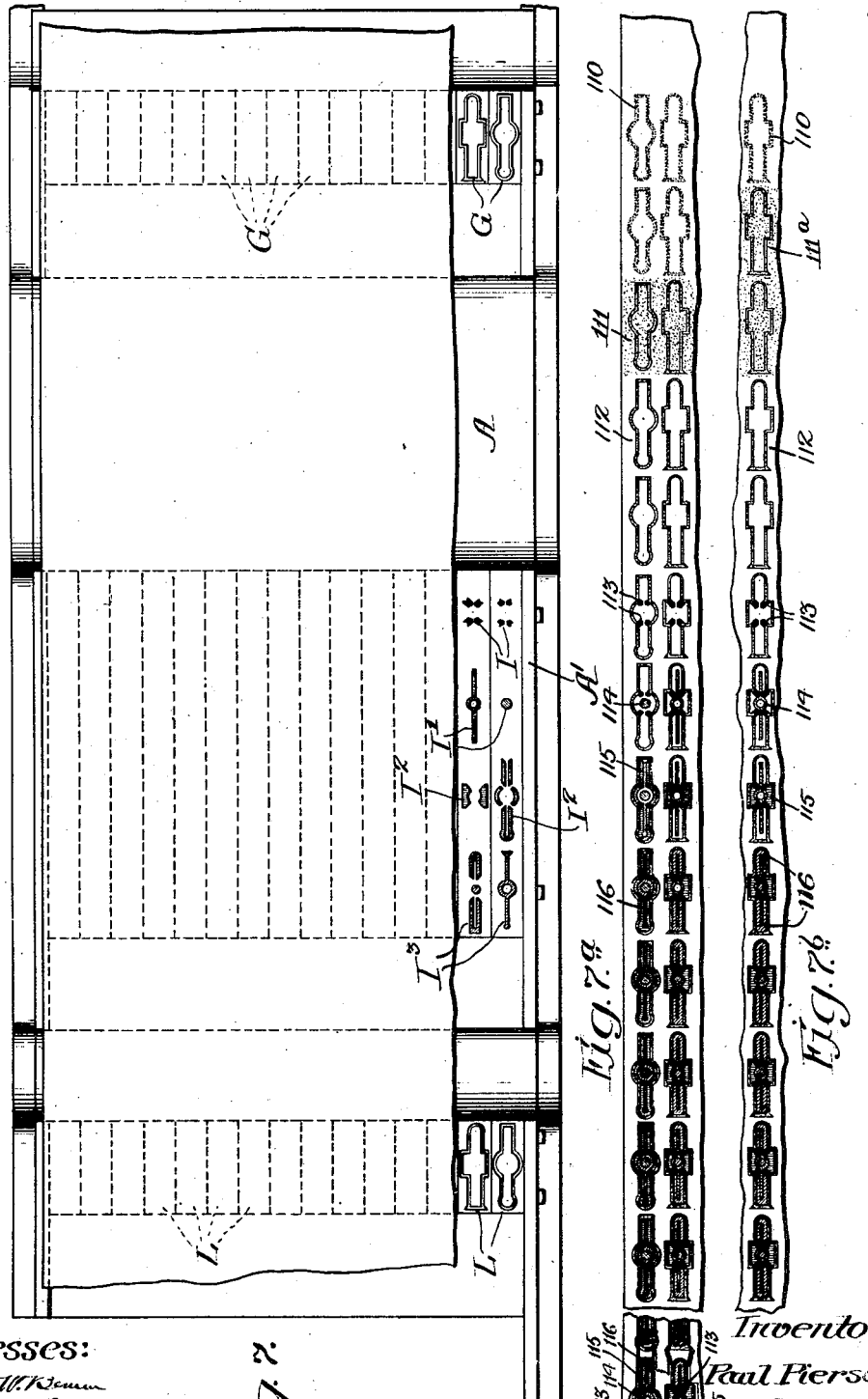

P. PIERSON.
MACHINE FOR MAKING CIGAR BANDS.
APPLICATION FILED AUG. 16, 1910. RENEWED MAR. 6, 1917.
1,250,008.
Patented Dec. 11, 1917.
12 SHEETS—SHEET 1.
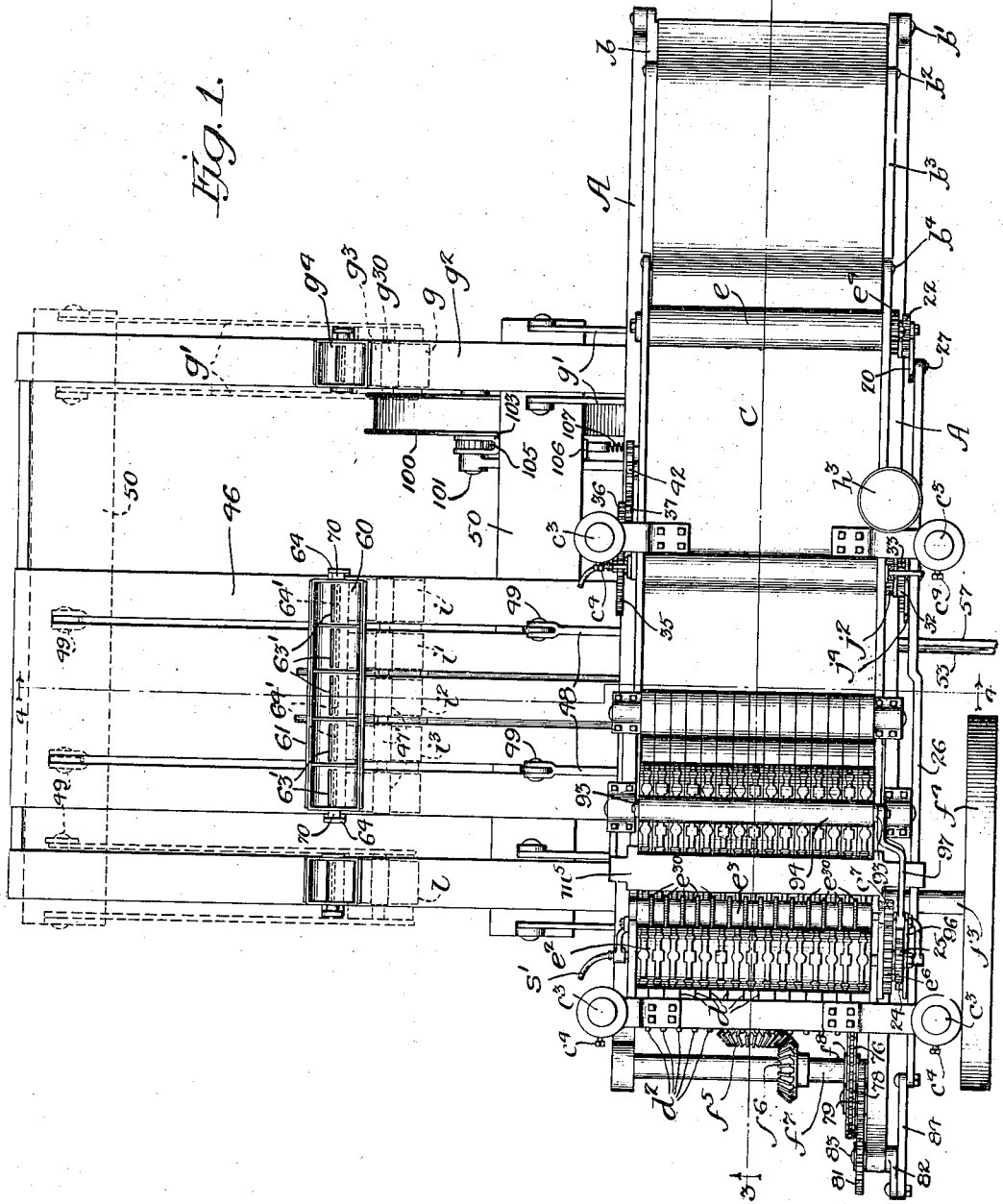
Witnesses:
Frank W. Bemm
Hildur C. Petersen
Inventor:
Paul Pierson
By:—Fred Gerlach
his Atty.

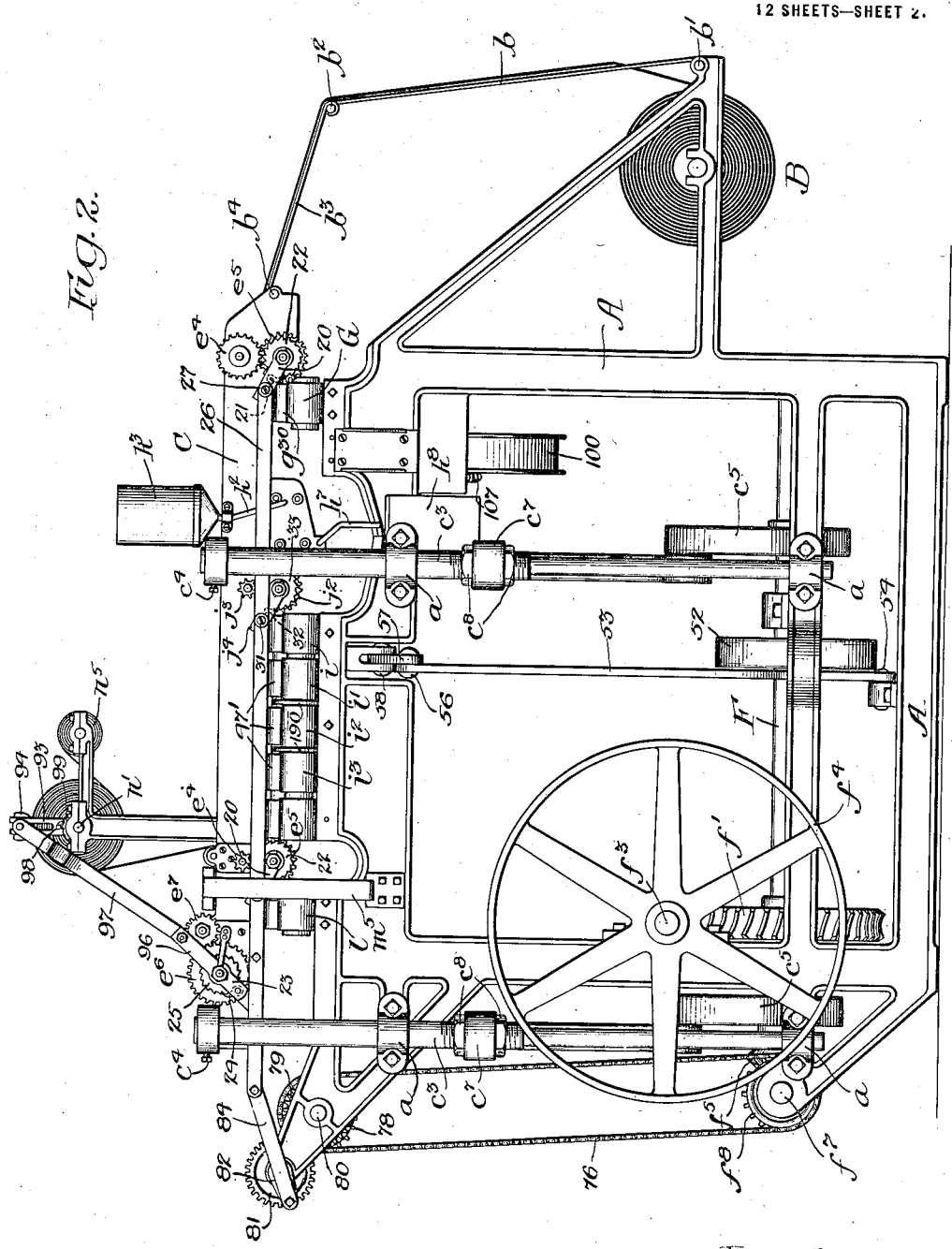

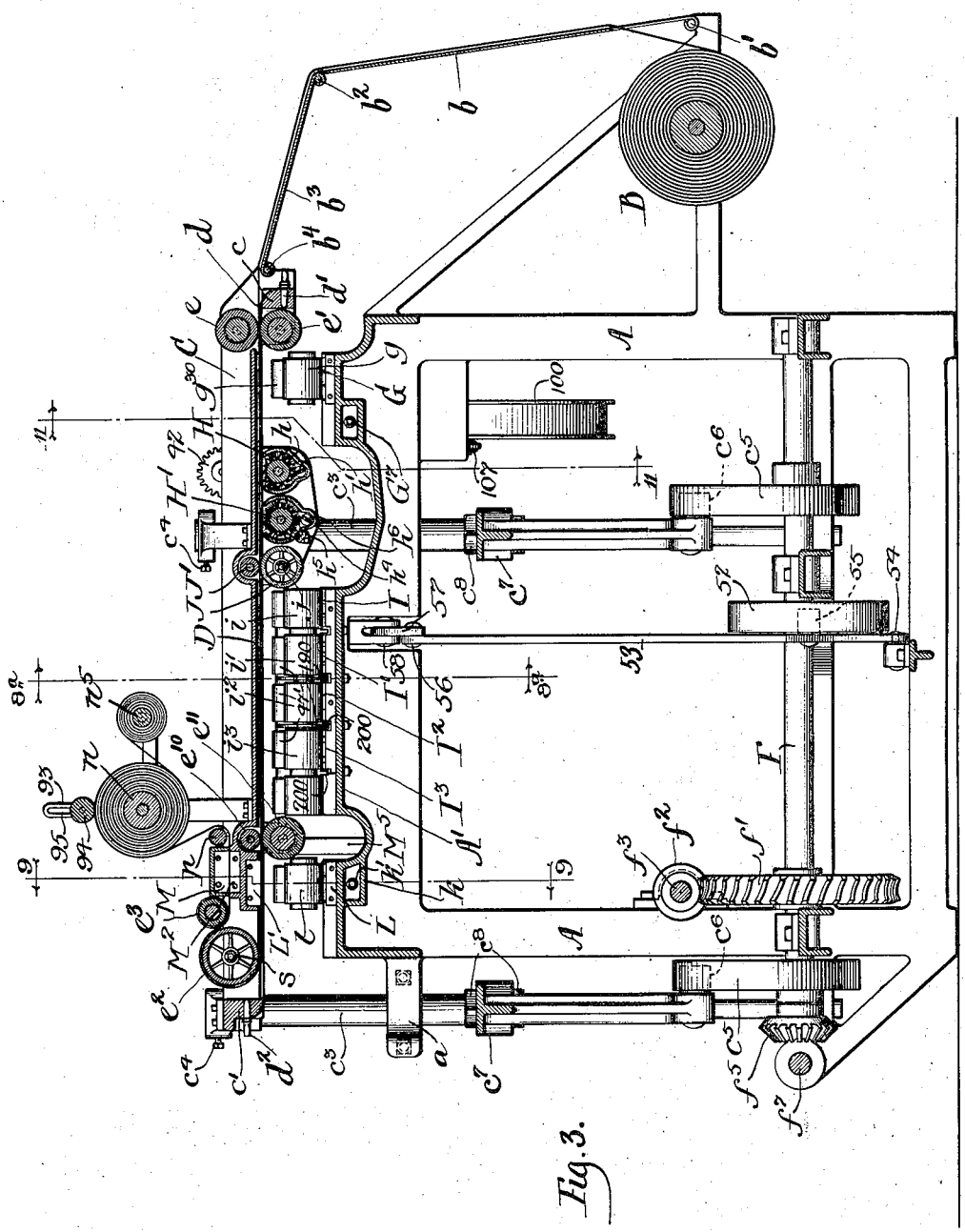

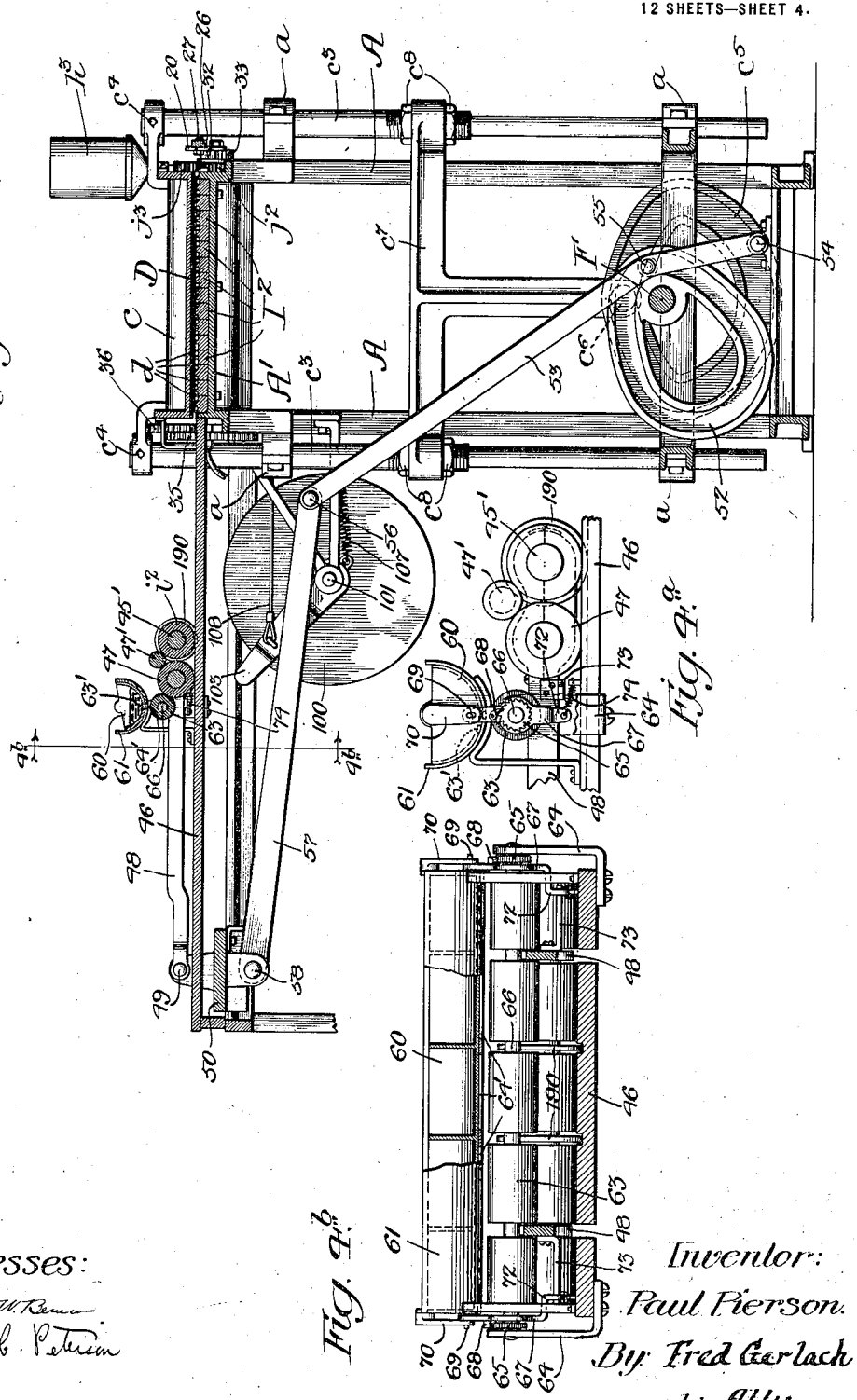

P. PIERSON.
MACHINE FOR MAKING CIGAR BANDS.
APPLICATION FILED AUG. 16, 1910. RENEWED MAR. 6, 1917.
1,250,008.
Patented Dec. 11, 1917.
12 SHEETS—SHEET 5.
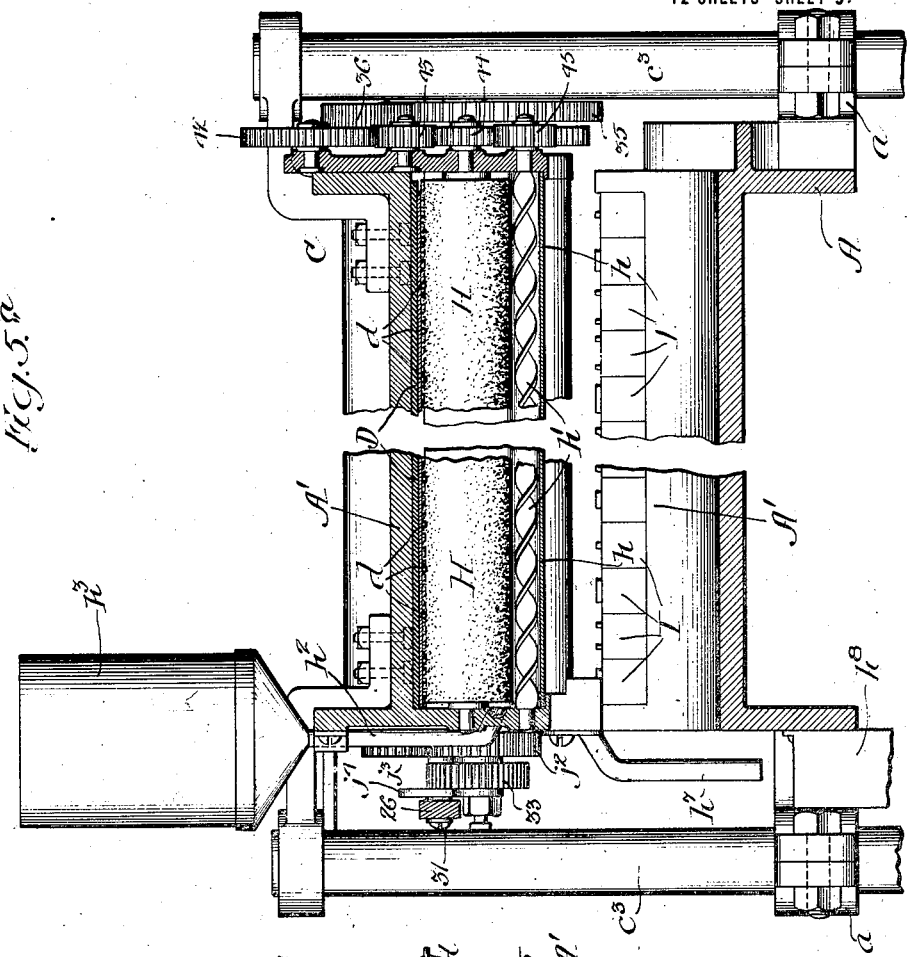
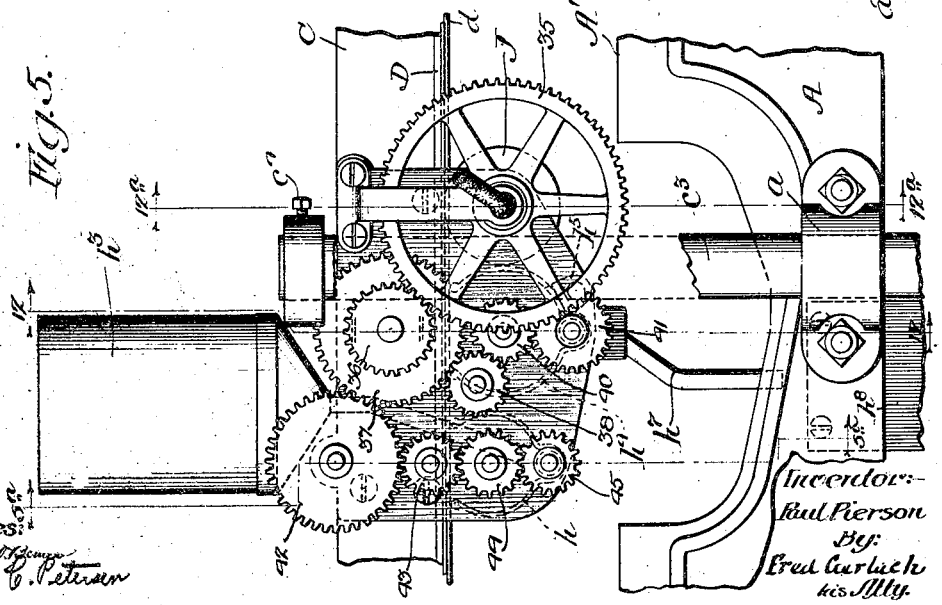

P. PIERSON.
MACHINE FOR MAKING CIGAR BANDS.
APPLICATION FILED AUG. 16, 1910. RENEWED MAR. 6, 1917.
1,250,008.
Patented Dec. 11, 1917.
12 SHEETS—SHEET 6.
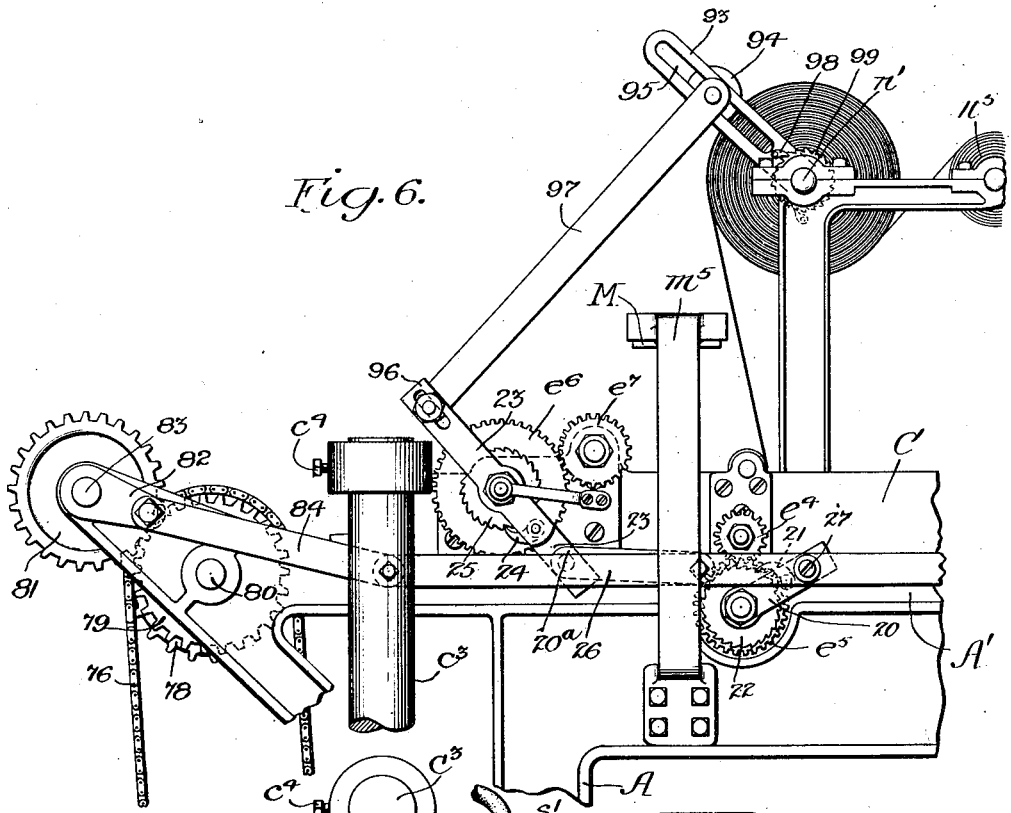
Fig. 6.
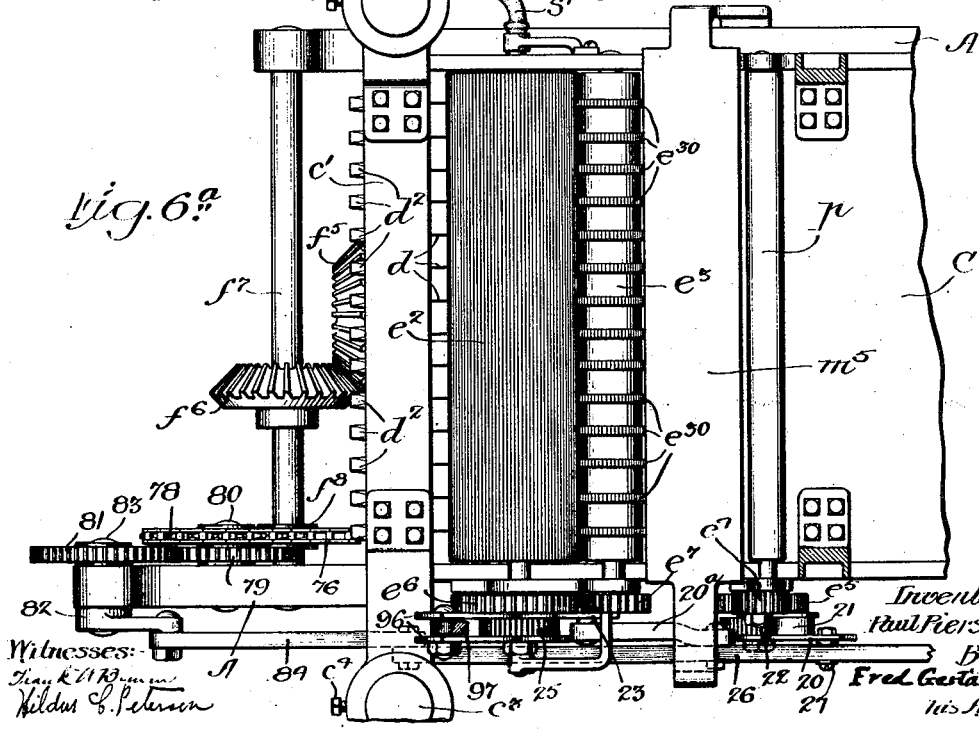
Fig. 6ª.
Witnesses:
Inventor:
Paul Pierson
By: Fred Gerlach
his Atty.

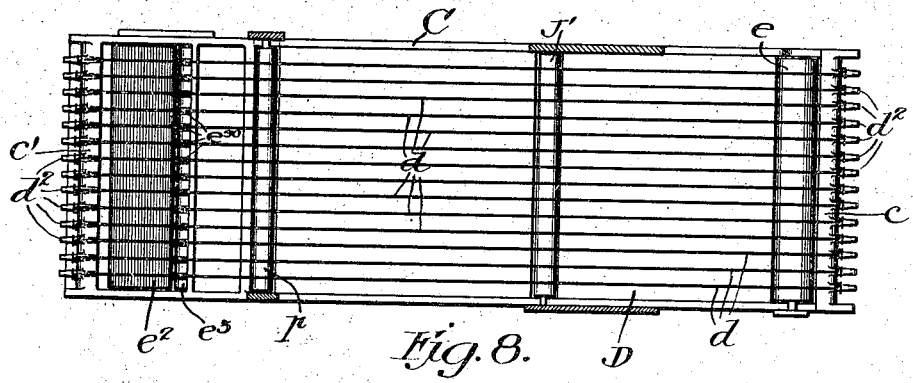
Fig. 8.
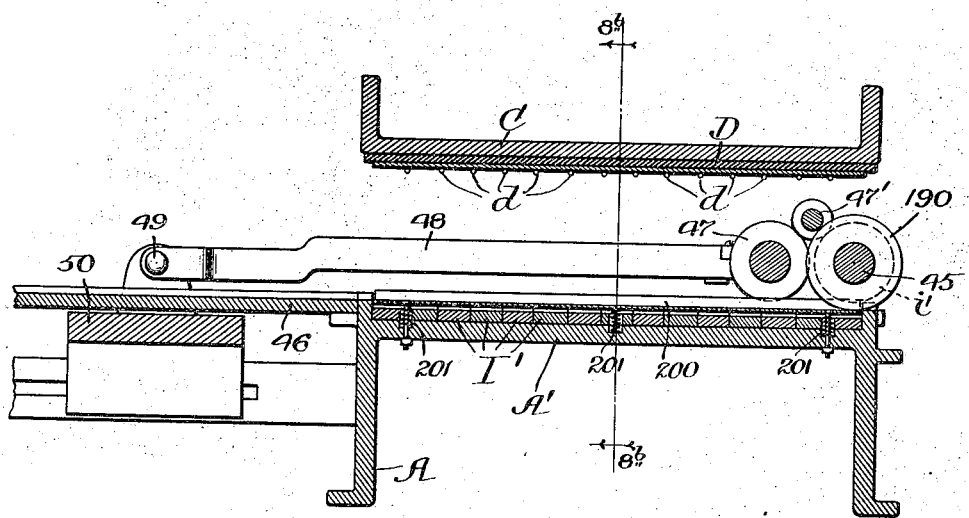
Fig. 8.ᵃ
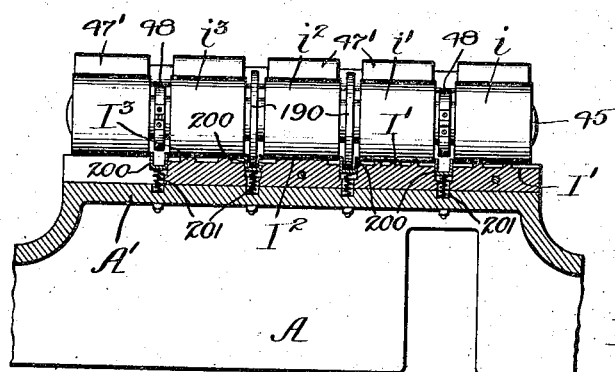
Fig. 8.ᵇ

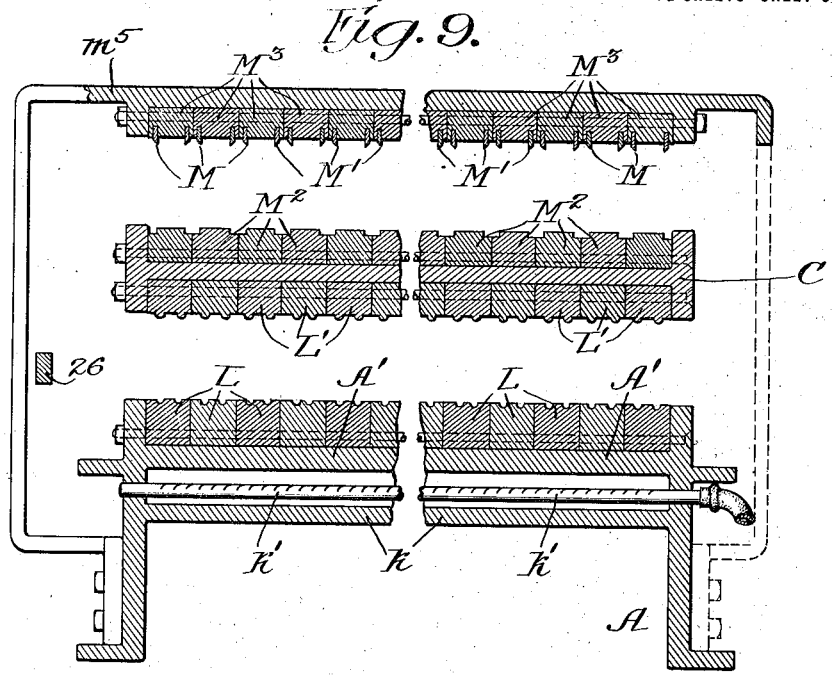
Fig. 9.
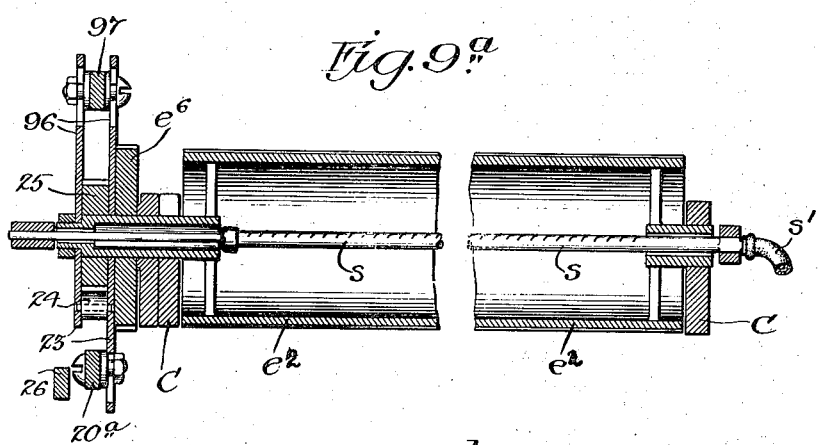
Fig. 9ª.
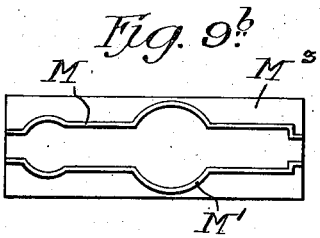
Fig. 9ᵇ.

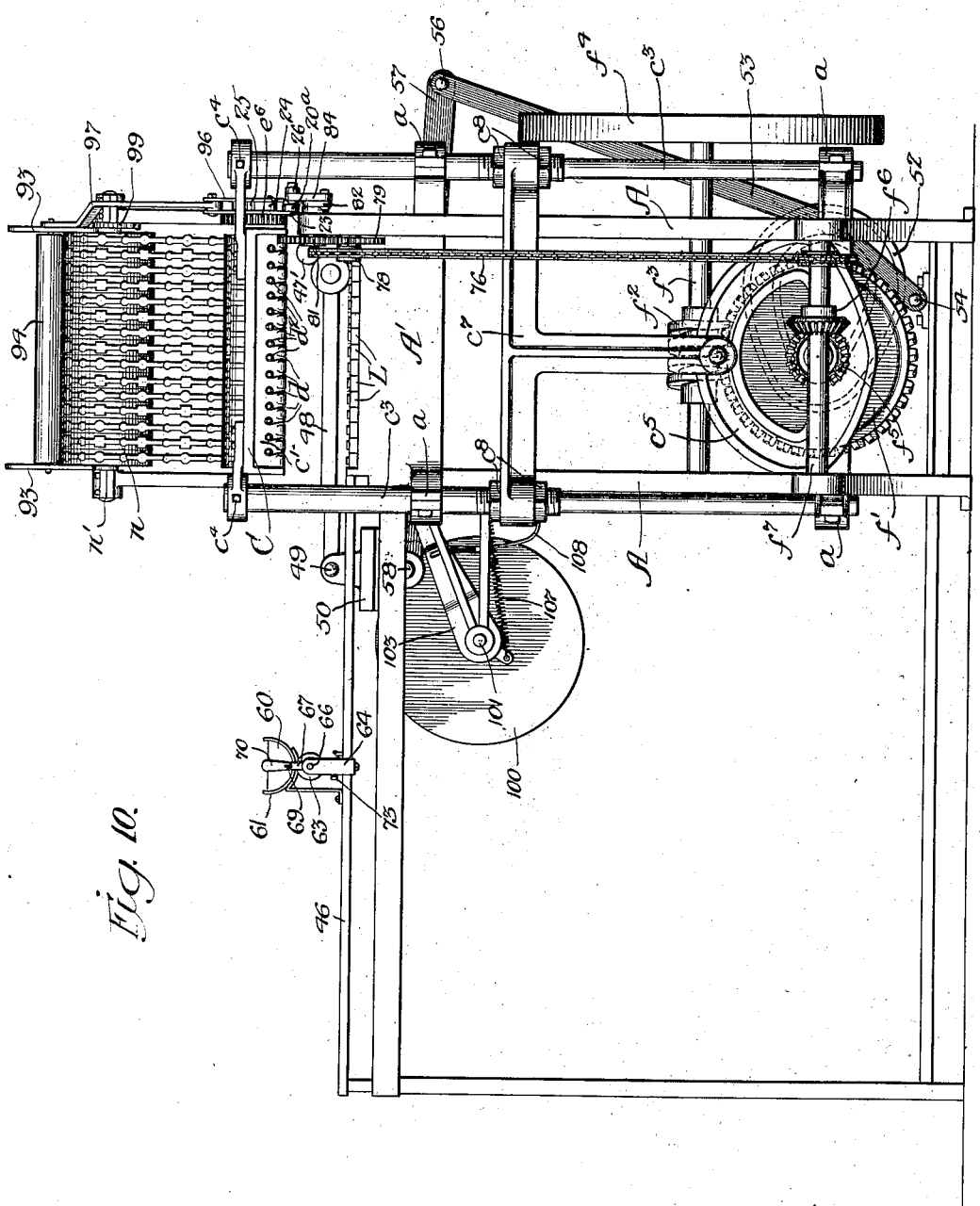

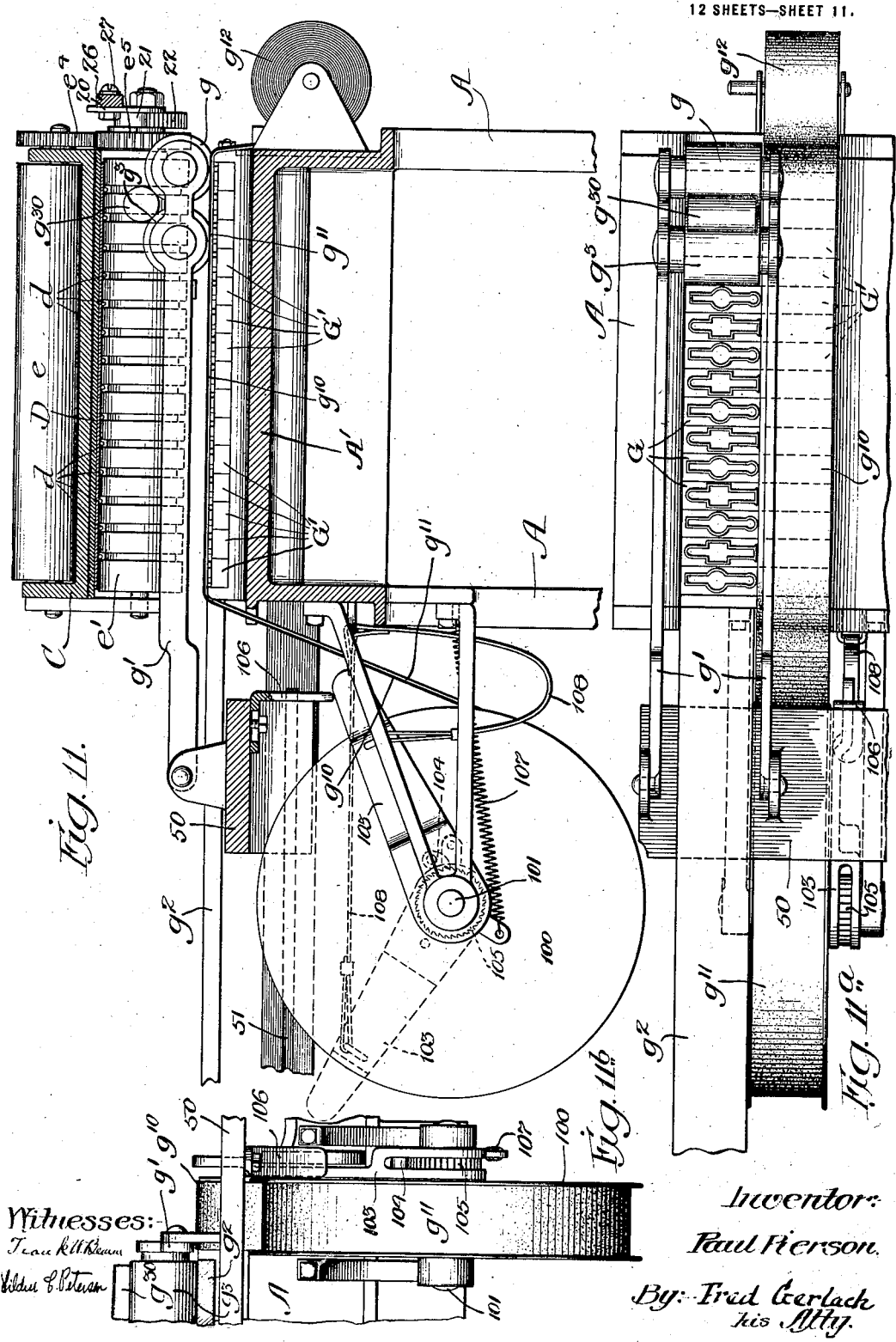

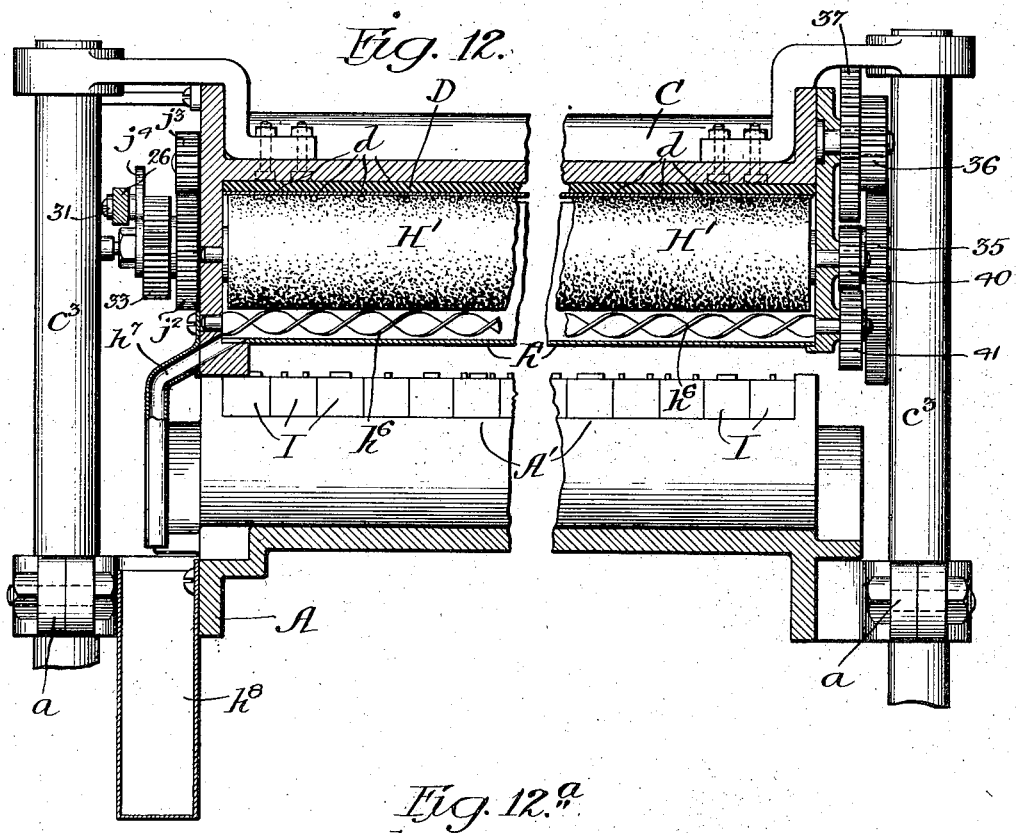
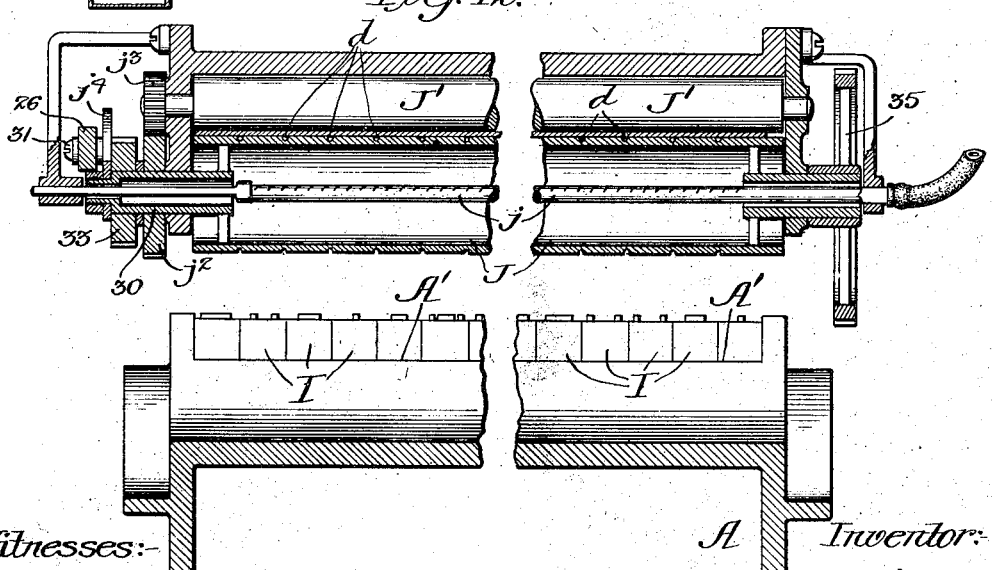

UNITED STATES PATENT OFFICE.

PAUL PIERSON, OF CHICAGO, ILLINOIS.

MACHINE FOR MAKING CIGAR-BANDS.

1,250,008.  Specification of Letters Patent.  Patented Dec. 11, 1917.

Application filed August 16, 1910, Serial No. 577,501. Renewed March 6, 1917. Serial No. 152,874.

*To all whom it may concern:*

Be it known that I, PAUL PIERSON, a resident of Chicago, in the county of Cook and State of Illinois, have invented certain new and useful Improvements in Machines for Making Cigar-Bands, of which the following is a full, clear, and exact description.

The invention relates to machines for making cigar bands, which are usually printed in different colors and embossed. Heretofore it has been the common practice to make such bands by printing, gilding and embossing, sheets of paper by feeding the sheets through a press a sufficient number of times to print and color the bands, as desired. In that method of manufacture, it is necessary to repeatedly handle each sheet according to the number of operations or impressions necessary to make completed bands, depending on the number of their colors.

The present invention designs to provide a machine for continuously making bands, by successively impressing suitable forms on a web of paper. When a continuous web is successively impressed with the colors, gilt, embossed, and cut as the web passes through the machine, a single passage of the web through the machine, suffices to complete the bands, and repeated handling of the paper of which the bands are formed, will be unnecessary.

The invention consists in the several novel features hereinafter set forth and more particularly defined by claims at the conclusion hereof.

In the drawings: Figure 1 is a plan view of a machine embodying the invention. Fig. 2 is a side elevation. Fig. 3 is a section taken on line 3—3 of Fig. 1. Fig. 4 is a transverse section taken on line 4—4 of Fig. 1. Fig. $4^a$ is a detail elevation of the ink-supplying mechanism for the forms for printing colors on the web. Fig. $4^b$ is a section on line $4^b$—$4^b$ of Fig. 4. Fig. 5 is a side elevation of the mechanism for driving the bronze applying-mechanism. Fig. $5^a$ is a section taken on line $5^a$—$5^a$ of Fig. 5. Fig. 6 is an elevation of the mechanism for winding up the finished bands and the web-feeding mechanism. Fig. $6^a$ is a plan of the parts shown in Fig. 6, parts being removed. Fig. 7 is a plan view of the bed having two series of forms for successively, applying sizing, and gilt, embossing, printing and cutting the web to form strips of bands. Fig. $7^a$ is an inverted plan of a portion of the web, and showing the manner in which the web is successively bronzed, printed in colors, embossed and cut. Fig. $7^b$ is a similar view showing a portion of the web when the band is to be made with leaf-gilt. Fig. 8 is an inverted plan of the platen. Fig. $8^a$ is a section on line $8^a$—$8^a$ of Fig. 3. Fig. $8^b$ is a section on line $8^b$—$8^b$ of Fig. $8^a$. Fig. 9 is a section on line 9—9 of Fig. 3, showing the knives for cutting the web to leave a connected series of finished bands. Fig. $9^a$ is a section through the last drying-roll. Fig. $9^b$ is an inverted plan of one of the cutter dies. Fig. 10 is an end elevation. Fig. 11 is a transverse section on line 11—11 of Fig. 3, showing gold-leaf supplying-mechanism. Fig. $11^a$ is a plan and Fig. $11^b$ is an end-view of the parts shown in Fig. 11. Fig. 12 is a transverse section taken on line 12—12 of Fig. 5, showing the brush for removing excess bronze from the web. Fig. $12^a$ is a transverse section taken on line $12^a$—$12^a$ of Fig. 5, showing the burnishing roll.

A denotes a suitable frame whereby the several mechanisms of the machine are sustained in operative position. At one end of the frame, a roll of paper B is sustained to be continuously fed to the machine. The web is guided by an apron $b$ having its lower end pivoted to the frame, as at $b'$, and its upper end pivotally connected, as at $b^2$ to an apron $b^3$ which has its front end pivotally connected at $b^4$ to a reciprocable platen-carrying frame C. These aprons guide the web from the roll to the platen and web feeding mechanism. Platen-frame C is provided with a platen D beneath which the web passes as it is fed through the machine. Longitudinally-extending wires $d$ (Fig. 3) are stretched on the face of the platen, to hold all portions of the web flat and snugly against the platen and to prevent the web from adhering to the forms which are impressed thereon. At one end, said wires are connected to keys $d'$ which are adjustably secured in a cross bar $c$ and at their other ends, these wires are similarly connected to keys $d^2$ in a cross-bar $c'$ of the platen-frame, and by means of these keys, the wires may be kept taut to hold the web flat against the platen and prevent it from adhering to the forms which impress the under side of the web. A drive-shaft F (Figs. 2 and 3) is suitably journaled in the lower portion of the frame A and is driven by a worm-gear $f'$ and a worm-wheel $f^2$ which on a cross-shaft $f^3$ is suitably journaled in the frame and is connected by any suitable means, such as a belt-pulley $f^4$, with a suitable source of power.

The platen-carrying frame is reciprocable and is secured, by screws $c^4$, to the upper end of four standards $c^3$, which are mounted to slide in guides $a$ formed on the main frame A. The platen-carrying frame is reciprocated vertically to cause the web to be impressed, as hereinafter set forth, by a pair of cams $c^5$ (Figs. 3 and 10) which are secured to drive-shaft F, studs or rollers $c^6$ mounted on the lower ends of frames $c^7$ respectively, which are secured to the standards $c^3$, whereby the platen-carrying frame is reciprocated. Drive-shaft F is constantly driven and cams $c^5$ are formed to reciprocate the platen-carrying frame and to hold it stationary during the period in which the forms are being supplied with ink. During each revolution of shaft F, the platen will be reciprocated to cause the web to be impressed by the forms on the stationary bed. Frames $c$ are adjustably connected to standards $c^3$ by nuts $c^8$, so that the stroke of the platen may be varied to cause impression of the forms on the web. The main frame A is provided with a table or bed A' for the forms for impressing the web. This bed is stationary and holds the forms in position to impress the web when the platen is reciprocated.

The web passes successively between, a pair of feed-rolls $e$ $e'$ (Fig. 3) at a point where the web passes to the platen, and another pair of feed-rolls $e^{10}$, $e^{11}$ near the end of the platen and between a pair of feed-rolls $e^2$, $e^3$ after the web leaves the platen. These pairs of feed-rolls are mounted in the reciprocable platen-carrying frame, so that they will be raised and lowered with the platen and the web. Feed-rolls $e$, $e'$ and $e^{10}$, $e^{11}$ are driven at the same surface speed by a pair of gears $e^4$, $e^5$ (Fig. 2) respectively secured to the rolls of each pair and meshing with each other. Feed-rolls $e^2$, $e^3$ are caused to travel at the same surface speed by gear-wheels $e^6$, $e^7$ respectively secured to said rolls. All of the web-feed rolls are simultaneously operated to intermittently advance the web in one direction, when the web is not in contact with the forms, so that the web will be stationary while it is being impressed or treated. The web is advanced step-by-step, to cause it to be successively fed through the machine and to the several forms for impressing it, so that in transit through the machine, the web will be treated to receive gilt or bronze, will then have bronze or gilt applied thereto, and will be printed in as many different colors as may be desired and will be embossed. The mechanism for operating the feed-rolls $e'$ and $e^2$ to intermittently advance the web (Figs. 1, 2 and 6) comprises an arm 20 pivoted on each of the shafts of said rolls. Each arm 20 carries a spring-pressed pawl 21 for engaging a ratchet-wheel 22 secured to one of the gears $e^5$. In like manner, the feed-rolls $e^2$, $e^3$ will be intermittently operated in one direction by an arm 23, carrying a spring-pressed pawl 24 for engaging a ratchet 25 secured to gear $e^6$ and feed-roll $e^3$. A connecting-bar 26 is pivotally connected as at 27, to the pawl carrying-arm 23 and to the arm 20, by a link 20$^a$. This bar 26 which operates the web-feeding mechanism is connected to a crank 82 on a shaft 83, by a link 84. Shaft 83 is driven by a bevel-gear $f^5$ on drive-shaft F, which meshes with a corresponding gear $f^6$ on a cross-shaft $f^7$ which is journaled in the frame, a sprocket-wheel $f^8$ which is connected by a chain 76 to drive a sprocket-wheel 78 and a gear-wheel 79 secured thereto, and mounted to rotate on a stud 80 secured in the main frame, a gear-wheel 81 secured to crank-shaft 82 and meshing with gear 79. This mechanism is continuously driven to rotate crank 83 which reciprocates the operating-bar 26 and by means of the one-way connections between said arms of the feed mechanism and the web-feeding rolls, the latter will be intermittently rotated in one direction and remain stationary during the retraction of the bar. In operation, said bar will be reciprocated once for each operation of the platen to cause the feed-rolls to advance the web one step for each operation of the platen or impression made on the web.

Cigar bands are ornamented with a gilt design which is sometimes formed by impressing gold-leaf thereon and other times by impressing bronze-power thereon. The machine is adapted to initially impress a gilt design on the web, either in gold leaf or bronze powder. In Figs. 1, 2 and 3 the machine is illustrated as equipped for applying bronze power to form a gilt design on the band. The bed A' is of sufficient width to receive a series of forms transversely disposed thereon, so that a transverse series of impressions extending across the web, may be made by one operation of the platen.

A series of forms G is mounted on the bed to impress the web after it has passed through feed-rolls $e$, $e'$. These forms have a suitable design thereon corresponding to the gilt-design to be impressed on the bands and are adapted to apply a sizing of corresponding design to the under face of the web, when the platen is lowered to press the web against these forms. This sizing causes the gilt or bronze to adhere to the web, so that the gilt or bronze subsequently applied, will form a design 110 (Figs. 7$^a$, 7$^b$) corresponding to the design of the sizing applied by form G. Sizing is supplied to the forms G for transfer to the web by a roll $g$ (Figs. 1 and 11) which is moved transversely across the series of forms G after each impression of said forms on the web, and while the platen is in raised position, the rolls being withdrawn from between the web and forms before the platen is lowered, to cause an impression on the web. The roll $g$ is operated back and forth across the series of forms G by a reciprocating slide 50 which is connected to the roll by operating bars $g'$. Said roll receives sizing from a table $g^2$ to which the sizing is carried by a roll $g^3$ which receives a measured quantity of sizing from an automatic supplying-device $g^4$ of a construction hereinafter set forth. A distributer-roll $g^{30}$ is disposed between rolls $g$ and $g^3$. Rolls $g^3$ and $g^{30}$ are operated back and forth with roll $g$, by slide 50. Slide 50 is mounted to travel on suitable ways 51 secured to the main frame A and extending transversely thereof. Said slide is operated back and forth to correspondingly operate the sizing-supplying mechanism (also the inking mechanism hereinafter set forth) by a cam 52 secured to rotate with drive-shaft F (Figs. 3 and 4), and a lever 53 which is pivoted to the frame, as at 54, which has a stud 55 extending into a groove in the cam 52. The lever has its upper end pivotally connected, as at 55, to a link 57 which is pivotally connected to the slide 50, as at 58. Resultantly, during each revolution of drive-shaft F, slide 50 and the rollers operated thereby, will be operated across the forms on the bed. These rollers will pass across the forms while the platen is raised and are withdrawn before the platen is lowered.

After the sizing has been applied to the web by the forms G, either bronze powder may be applied to the sized design or designs on the web, or gold-leaf may be impressed in designs upon the web. When gold-leaf is to be impressed on the sized designs of the web, a series of forms G' (Fig. 11) are placed on the bed A', and when bronze powder is to be applied to the sized designs, these forms G' are not used, being removed from the machine. For either bronze powder or gold-leaf, the sizing is applied to the web by forms G.

When bronze powder is to be applied, the web will be advanced step by step and after the sizing has been applied by the forms G, the sized face of the web will receive bronze powder from a rotating brush H which is mounted in the platen-carrying frame, to reciprocate with the platen.

A jacket $h$ is secured to the platen-carrying frame and brush H rotates in said jacket. Bronze-powder is supplied to and distributed (Figs. 3, 5 and 5ª) across the width of the brush, by a screw-conveyer $h'$, which extends transversely across the frame C in a trough formed in the bottom of jacket $h$. Bronze-powder is delivered to said screw-conveyer by a tube $h^2$ which is connected to the bottom of a suitable receptacle $h^3$ which contains a supply of suitable powder. Brush H and screw-conveyer $h'$ are intermittently rotated so that, as the web is fed along the platen, bronze-powder will be applied to and distributed on the under side of the web, the powder adhering mostly to the sized designs on the web. As the web advances beyond brush H, the excess powder and the powder adhering to the unsized portion of the web will be removed by a brush H' (Fig. 12). The powder adhering to the sized portions or designs will not be removed by said brush. Brush H' will be intermittently operated during the advance of the web by mechanism hereinafter set forth. This brush is mounted in a housing $h^4$ fixed in the platen-carrying frame. A stationary brush $h^5$ is disposed in said housing $h^4$ to engage brush H' and remove the powder which has been brushed off the web from brush H'. A screw-conveyer $h^6$ is mounted in a trough in the bottom of housing $h^4$ and conveys the powder removed from the web to a tube $h^7$ which delivers it into a suitable receptacle $h^8$. This receptacle may be emptied into the supply-receptacle $h^3$, so that the excess powder may be utilized. After the web has been advanced beyond the brush H', gilt designs in bronze powder, corresponding to the designs on forms G, will have been impressed on the web.

When the gilt design or designs have been applied to the web, the latter passes between burnishing-rolls J, J' (Fig. 3), which are mounted above and below the web respectively, so that the latter will pass therebetween. A suitable heater $j$, such as a gas-burner is disposed in roll J to heat it and cause the gilt designs on the web to be dried and burnished. These burnishing rolls are provided with meshing gears $j^2$, $j^3$ (Fig. 2) which cause them to travel at the same surface speed as the web, and to serve as web-feed rolls. These rolls are intermittently operated by an arm $j^4$ pivoted on a stud 30 on roll J. This arm is pivotally connected at 31 to the bar 26 which operates the web-feeding rolls, and carries a pawl 32 which engages a ratchet 33 to operate the burnish rolls in one direction, synchronously with the web-feeding rolls.

The powder-applying brush H, screw-conveyer $h'$, the powder-removing brush H' and screw-conveyers $h^6$ are operated synchronously with the web-feeding mechanism, by gear trains (Fig. 5) which are driven by the roll J, which is operated intermittently and simultaneously with the web-feeding rolls. A gear-wheel 35 is secured to rotate with burnishing roll J. This gear-wheel drives the powder-removing brush by means of a gear-train (Figs.

5 and 5ª) comprising a gear 36 meshing with gear 35, a gear 37 secured to rotate with gear 36, an idler gear 38 meshing with gear 37 and with a gear 40 secured to rotate the brush H'. Said brush is driven to travel with the web to properly apply the powder to the sized portions of the web. Conveyer $h^6$ is driven by a gear 41 which is secured to rotate said screw and meshes with gear 40 on brush H'. The powder-applying brush H is driven by a gear-wheel 42 which meshes with gear 37 and drives an idler 43 which drives a gear 44 secured to said brush. Movement is imparted to the screw-conveyer $h'$ which feeds the powder to brush H by a gear 45, which meshes with gear 44 on brush H. By the mechanism thus set forth, the web-feeding rolls, the powder-applying brush, the powder-removing brush, and the burnishing-rolls will be synchronously and intermittently operated step-by-step according to the length of the forms.

In some instances it is desired to impress gold-leaf on the band, in lieu of bronze-powder. The machine is also adapted to impress gold-leaf on the web, as shown in Figs. 11, 11ᵇ. A series of forms G', which are duplicates of the forms G, are disposed to impress gold-leaf on the sized designs of the web. A strip of gold-leaf $g^{10}$ is fed transversely across a series of dies G'. In practice, the gold-leaf is laid on a thin strip of paper $g^{11}$ or tape to carry it into position to be applied to the web. The gold-leaf is fed to the forms G' from a roll $g^{12}$ on which the strip of paper $g^{11}$ with the gold-leaf thereon, is wound. After each impression of the web, the strip of gold-leaf is advanced for the next impression. The mechanism for advancing the gold-leaf carrying-strip $g^{11}$ to feed the leaf to the forms G', comprises a drum 100 which is journaled at 101 in supports on the main frame and is adapted to wind up the strip $g^{11}$ after the gold-leaf has been impressed on the web by the dies G'. The strip of paper passes from roll $g^{12}$ over the forms G to the drum 100. Drum 100 is intermittently operated to draw the leaf-carrying strip across the forms G', by an arm 103 pivoted on the shaft of drum 100, and carrying a pawl 104 which engages a ratchet-wheel 105 on the drum. The arm is operated in one direction to operate roll 100, by an abutment 106 on slide 50, which is reciprocated by mechanism hereinbefore set forth. Arm 103 is retracted by a spring 107 applied to shift arm 101 outwardly when the abutment is withdrawn from engagement with the arm. The retractile stroke of arm 103 is limited, and may be varied by, an adjustable connection 108 between said arm and the frame, this connection consisting of a flexible element, such as a strap which may be taken up or lengthened as desired. By limiting the retractile stroke of arm 103, the amount of advance of the gilt-carrying strip may be varied so that gilt will be supplied only to some portions of the web, if it is not desired to impress gold-leaf on all of the bands, it being understood that the corresponding number of the forms G' will be omitted.

The gold-leaf applying operation will be as follows: A design of sizing will be first applied to the web for each label being printed, by the first impression of the forms G. The web will then be advanced one step (the length of a band) to bring the sized designs on the web above the forms G'. A heating-chamber $G^7$ is formed below the dies G', to cause the gold-leaf to adhere more quickly to the sized design. The gilt-carrying paper will extend across the series of forms G' with the gilt on the top thereof, so that during the next operation of platen D, said forms will impress the gold-leaf on the sized designs or sized portions on the under side of the web. After the gold-leaf has been impressed and the platen has been raised, slide 50 will be operated to cause abutment 106 to operate arm 103 to advance the gilt-carrying strip sufficiently to bring the next portion thereof with gilt thereon, into position to be impressed on the web during the next operation of the platen. When gold-leaf is to be impressed, the powder-applying brush H and screw-conveyer $h'$ and housing $h^4$ may be removed from the platen-carrying frame, or may be permitted to remain if no powder is supplied thereto. After the gold-leaf has been impressed on the web, and during the impression, the gilded portions will reach brush H', which will remove any gold-leaf adhering to the unsized portion of the web, so that a perfect gold-leaf design will be made on the web. As the web with its designs in gold-leaf passes through the burnishing rolls J, J', the leaf will be dried and burnished.

After the gilt designs have been impressed and burnished on the web, the colors desired are successively impressed on the web, one during each operation of the platen until the printing of the band has been completed. For this purpose forms I, I', I², I³ (Fig. 3) are progressively disposed on the bed A', so that during each operation of the platen, one additional color will be impressed on the web until the desired number of colors have been impressed. Each of these forms has a raised design corresponding to one of the designs to be applied in one color. These forms may also be arranged in transverse series corresponding to a series of dies G, so that a number of strips extending across the width of the web, will be simultaneously printed. The machine is illustrated as provided with five series of forms for printing a band having four different colors in addition to the gilt design, but it is manifest that a greater number of these forms may be employed if desired, or some of the forms may be omitted to print a label with less colors.

Ink is supplied to said color printing forms respectively by inking rolls, $i$, $i'$, $i^2$, $i^3$ (Figs. 1, 4, 4$^a$ and 4$^b$) which are mounted to move transversely across the forms and to apply ink of the desired colors to the forms of each series, each time that the rolls are operated over the forms. These inking-rolls are mounted on a shaft 45' and travel on a table 46 which is divided into sections corresponding to said rolls. A distributer-roll 47 is provided for each of the inking-rolls and travels on the table 46, and an idler-roll 47' is disposed between each roll 47 and the inking-rolls respectively. These inking and distributing rolls are journaled in a pair of bars 48 which are pivotally connected as at 49, to slide 50.

An ink-container 60 is divided into sections corresponding to the inking-rolls, so that each section will be supplied through its roll 47 with ink of the desired color. This container is pivotally sustained in a holder 61, which is secured to the table 46. The bottom of the ink-container is provided with a series of slots 63' adapted to move into and out of registry with corresponding slots 64 in the holder 61 to permit a measured quantity of ink to be supplied to the rolls 47 during each reciprocation thereof. The ink discharged through said slots 63' and 64' is delivered onto a divider roll 63 which is journaled in standards 64 secured to table 46. A ratchet 65 is secured to a shaft 66 to which the rolls 62 are mounted and a lever 67 is pivotally mounted at each end of said shaft and this lever carries a pawl 68 adapted to engage and intermittently rotate ratchet 65. The upper end of each of these levers is connected by a pin and slot connection 69 to an arm 70, secured to the holder 60. The lower end of each of levers 67 is extended downwardly, as at 72 into position to be struck by an abutment 73 secured to bar 48. A spring 74 is applied to each lever 67 to retract it. Resultantly, at the end of each outward operation of slide 50 abutment 73 will engage lever-arm 72 to rock the lever 60 and rotate roller 63 by means of pawl 68, to ratchet 65, and to rock the holder 60 into position to permit a measured quantity of ink from each of the sections thereof to fall onto the corresponding roll 63 by means of pin-and-slot connection 69. At the end of each outward stroke, rollers 47 will contact with the ink-rolls 63 respectively and receive a supply of ink therefrom. Rollers 47 will distribute the ink on table 46 and rollers 45 passing over the ink table 46 will be supplied with ink to be transferred to the printing forms. After the initial upward movement of slide 50, abutments 73 will pass out of engagement with lever-arms 72 and springs 74 will cut off the supply from container 60. Resultantly, rollers 45 will be automatically supplied with ink during each operation and will transfer the ink to the printing form. Rolls 190 (Figs. 8$^a$ and 8$^b$) are arranged between the inking-rolls $i'$, $i^2$, $i^3$, to travel in grooves between the sections of the inking-table, to confine the inking-rolls against longitudinal movement on the table. Between the color printing forms I, I', I$^2$, I$^3$, transverse bars 200 (Figs. 3, 8$^a$ and 8$^b$) are normally held with their upper edges slightly above the printing faces of said forms, by springs 201. These bars 200 are U-shaped in cross-section and are pressed downwardly toward the bed A' by the web-retaining wires $d$ when the platen is operated to make an impression, to keep the wires pressed firmly toward the platen to keep the web flat, and to cause the wires to follow the platen and web during the initial upstroke of the platen, if there is any tendency of the web to adhere to the forms.

A mechanism similar to that employed for supplying ink to the inking-rollers, is provided for supplying sizing to the sizing rollers. Since this mechanism is of the same construction, it has not been deemed necessary to describe it in detail.

The better grades of cigar bands are embossed, as well as gilded and printed in colors, and the present invention designs to provide for embossing the web during one of the successive impressions upon the web, as it passes through the machine, so that a separate embossing operation will not be necessary. This embossing is done by an impression subsequent to the color printing and gilding of the web. As a result of embossing the web in transit through the machine, the cost of producing embossed bands is materially lessened.

A transverse series of embossing dies L is mounted on the bed A' to impress the web and a series of coöperating female dies L' (Figs. 3 and 9) is secured on the platen-carrying frame above the web. Resultantly, during each operation of the platen, the web will be embossed when desired with respect to the printed designs or matter previously embossed. In order to give a finishing coat of varnish to the bands, varnish is applied to the female-dies before each operation of the web by a roll $l$. This roll is operated back and forth across the embossing dies L, and is supplied with varnish by mechanisms like those used for operation and for supplying ink, to, the rolls for color-printing, and therefore description in detail is not repeated. For the purpose of more effectively embossing the web and particularly those portions which have been printed in colors, heat is applied to the embossing dies, a chamber $k$ being formed in the bed $A'$ and a burner-pipe $k'$ in said chamber, being employed to heat the embossing dies.

The successive impressions upon the web as it passes through the machine when bronze powder is applied to the web are illustrated in Fig. 7$^a$ which represents a portion of the web as it is progressively impressed by two series of dies of different designs and in which 110 denotes a design of sizing applied to the web by dies G, 111 the bronze powder applied to the web, so that it will adhere to the sized portions. At 112 is shown the web with the bronze design after the excess powder has been brushed from it by brush $H'$. A design 113 of one color is printed on the web by dies I, next a design 114 of another color is impressed by dies $I'$, next another design 115 is impressed by dies $I^2$ and then a design 116 will be impressed by the dies $I^3$. The color printing has then been applied and the web is fed to the embossing dies L, $L'$ and simultaneously a coating of varnish or a finishing coat is applied to the printed face of the bands by said dies. It will be understood that the retaining-wires $d$ hold the paper between those portions of the web from which the bands are formed.

In Fig. 7$^b$, the web is illustrated as it is impressed with gold-leaf, printed in colors and embossed. The die G impresses a design on sizing 110 of the web, next the gold-leaf 111$^a$ is impressed on the sized design by form $G'$ and the excess leaf is removed therefrom by the brush $H'$. The remaining operations are substantially the same as those described in connection with Fig. 7$^a$. After the web has been embossed, it passes around feed-roll $e^2$ which is hollow and has a gas-burner $s$ therein which is connected to a suitable source of supply by a flexible tube $s'$. In passing around this feed roll $e^2$, the printed face of the web, faces outwardly and the web is dried by the heated roll. The feed-roll $e^2$ has a roughened or milled surface to firmly hold the web and feed roll $e^3$ has flanges or raised surfaces $e^{30}$ (Fig. 6$^a$) which engage the face of the web between the printed and embossed portions, so that the decorated or printed portions will not be mutilated or touched thereby.

Mechanism is provided for cutting the printed portions (Figs. 3, 6, 9 and 9$^b$) of the web into continuous strips, each strip consisting of a longitudinal series of bands. To cut the web into such strips, a series of cutters are secured in fixed relation over the main frame, by an arched frame $m^5$ (Fig. 9) to sever the web into strips at the end of the up-stroke of the platen, after the web leaves the feed-roll $e^3$. Each of these cutters comprises a block $M^3$ in which are set a pair of oppositely arranged knives M, $M'$ which sever the web as it passes over blocks $M^2$, which are mounted on the platen-carriage and have suitable edges coöperating with the knives, to sever the web into strips as it is fed over said beds and said carriage is reciprocated. Resultantly, at the end of each up-stroke of the platen, a series of embossed and printed bands will be cut out of the web.

After the web has been cut into strips of connected bands, the strips pass around a guide-roll $p$ to a reel $n$. The waste portions, being those between the printed and embossed strips, pass onto the top of the platen-carriage after passing over the blocks $M^2$ being severed from the web thereon, while the finished strips pass around roll $p$ to the reel $n$. To prevent the printed portions of the strip from adhering together on the reel, a strip of waxed paper is wound up with the printed strips, being fed to the reel from a spool $n^5$.

Reel $n$, is intermittently operated to wind up the finished strips as fast as they are printed, by mechanism comprising a slotted arm 93 on each end of the reel, each arm being pivoted on shaft $n'$ of the reel $n$ (Figs. 6 and 6$^a$), a friction-roller 94 (Figs. 1 and 6) extends across and bears on the strips on the reel and has its ends guided in slots 95 in arms 93, so that the roll will be free for self-adjustment to engage the surface of the strips on the reel. An arm 96 extending upwardly from the pawl-carrying arm 23 which operates the ratchet for feed-roll $e^2$, is connected to operate roll 94, by a pitman 97. Arm 93 carries a pawl 98 which engages a ratchet 99 on reel-shaft $n'$ and operates the reel in one direction to wind up the printed strips. Resultantly, the movement of reel $n$ will be graduated to wind up the strip a distance corresponding to the length of one band, despite variation of the diameter of the rolls on the reel, it being understood that arm 96 and pitman 97 are operated synchronously and intermittently with the web feed-rolls.

The operation of the machine will be as follows: Assuming power to be applied to the drive-shaft F and the web of paper to have been brought between the web-feed rolls carried by the platen-carriage C, so that the web will be intermittently advanced thereby, shaft F will be driven continuously to cause, cams $c^5$ to reciprocate the platen-carriage, and cam 52 to reciprocate the slide 50, which operates the rolls for supplying sizing, ink and varnish to the forms or dies, so that between each impression, the forms will be supplied with the desired material for application to the web. This operation will proceed continuously as the web progresses through the machine. As a portion of the web reaches the platen and overlies the forms G, the next impression will cause these forms to apply sizing in designs corresponding to the gilt-designs to be applied to the bands. Next, the same portion of the web will have bronze powder applied to it by brush H, or if gilt-leaf is to be applied, then the latter will be impressed on the sizing by forms G', as hereinbefore set forth. Next, the excess bronze or gilt will be removed by brush H' and then the gilded or bronzed portions will pass between rolls J, J' and be burnished thereby. Next in succession, the colors will be printed by the forms I, I', I², I³. Next, the web with its color-printing and bronze or gilt, will pass between feed-rolls $e^{10}$, $e^{11}$ and by the subsequent impression, the web will be embossed by dies L, L, and simultaneously a thin coat of varnish will be applied to the printed and embossed portions of the web. Next, the web will pass around the heated rolls $e^2$ and be dried and then the web will be cut into strips by knives M, M', the printed strips of connected bands being wound upon reel $n$ with a strip of waxed paper between the convolutions thereof, while the waste passes onto the top of the platen and may be removed when desired or in any convenient manner.

Since the web is simultaneously pressed against all of the forms and the dies on the bed, obviously, each operation of the platen results in the complete formation of a series of bands corresponding to the transverse series of forms provided on the bed. Each operation of the platen also results in cutting a series of bands from the web and into strips, which, for convenience in handling, are left in connected relation. Obviously, if desired, any desired number of bands may be formed during one operation, according to the width of the web or if desired, a narrow strip or web of paper may be used to make a single strip of connected bands.

The invention thus provides a machine for continuously making finished cigar bands from a web of paper by a single passage through the machine, such bands being gilded, printed in colors and embossed.

The invention is not to be understood as restricted to the details shown and described, since these may be modified within the scope of the appended claims, without departing from the spirit and scope of the invention.

Having thus described the invention, what I claim as new and desire to secure by Letters Patent, is:

1. In a machine for making cigar bands, the combination of web-feeding mechanism, conjointly operated intermittent mechanism for successively impressing gild on, and embossing the web between the advances of the web by the feed-mechanism, and intermittent mechanism for supplying gild to the web.

2. In a machine for making cigar bands, the combination of web-feeding mechanism, conjointly operated intermittent mechanism for successively impressing gild on, printing and embossing the web between the advances of the web by the feed-mechanism, means for heating the embossing mechanism for supplying gild to the web.

3. In a machine for making cigar bands, the combination of web-feeding mechanism, conjointly operated intermittent mechanism for successively printing different colors on the web and embossing it as it is advanced by the web-feed mechanism, ink-feeding mechanism operating transversely to the web, and mechanism for heating the embossing mechanism.

4. In a machine for making cigar bands, the combination of web-feeding mechanism, conjointly operated intermittent mechanism for successively impressing gild on the web and for printing different colors on it as it is advanced by the web-feed mechanism, ink-feeding mechanism operating transversely to the web, and means for heating the embossing mechanism.

5. In a machine for making cigar bands, the combination of step by step web feeding mechanism, conjointly operated intermittent mechanism for successively impressing gild on and printing the web as it is advanced by the feed-mechanism, means for feeding a web of gild to the impressing mechanism, and means for drying the web in transit from the gild impressing and the printing mechanism.

6. In a machine for making cigar bands, the combination of web-feeding mechanism, and conjointly operated intermittent mechanism for successively applying sizing to the web for applying gild to the sized portion of the web and for printing the web between advances of the web comprising a substantially flat form for applying sizing to the web.

7. In a machine for making cigar bands, the combination of web-feeding mechanism, forms for successively applying sizing to the web, applying gild to the sized portions, printing the web and embossing it between the advances of the web, and conjointly operated intermittent impression means for simultaneously applying the sizing and gild, printing and embossing to the web.

8. In a machine for making cigar bands, the combination of step by step web-feeding mechanism, conjointly operated intermittent mechanism for successively applying sizing to the web for applying gild to the sized portion of the web and for printing the web between advances of the web, and intermittent and conjointly operated mechanisms for feeding ink to the printing mechanism and a web of gild to the gild-applying mechanism.

9. In a machine for making cigar bands, the combination of step by step web-feeding mechanism, intermittent and conjointly operated mechanism for successively applying sizing to the web, applying gild to the sized portions thereof, printing the web and embossing it between advances of the web, intermittent mechanism for feeding a web of gild to said applying mechanism, means for drying the web between the gild applying and printing steps, and means for heating the embossing mechanism.

10. In a machine for making cigar bands, the combination of step by step web-feeding mechanism, intermittent and conjointly operated mechanism for successively applying sizing to the web for applying gild to the sized portions of the web and for printing different colors on the web and for embossing it between the advances of the web, and intermittent mechanism for feeding a web of gild to the gild-applying mechanism.

11. In a machine for making cigar bands, the combination of step by step web feeding mechanism, intermittent and conjointly operated mechanism for successively applying sizing to the web for applying gild to the sized portions of the web and for printing different colors on the web and for embossing it between the advances of the web, and intermittent mechanism for feeding a web of gild to the gild-applying mechanism, and means for drying the gild between the gild-applying and printing mechanisms.

12. In a machine for making cigar bands, the combination of intermittent web feeding mechanism, intermittent and conjointly operated mechanism for successively impressing sizing and gold-leaf on the web, printing the web and embossing the web between the advances of the web, means for heating the web between the gold-leaf applying and the printing operations, and means for drying the web between the printing and embossing operations.

13. In a machine for making cigar bands, the combination of step-by-step web-feeding mechanism, intermittent and conjointly operated mechanism for successively applying, impressing the sizing and gold-leaf on the web and printing the web, as it is advanced by the web-feeding mechanism and step by step means for feeding a web of gold leaf to the impressing mechanism for each impression.

14. In a machine for making cigar-bands, the combination of step-by-step web-feeding mechanism, intermittent and conjointly operated mechanism for successively impressing sizing and gold-leaf on the web, printing and impressing the web, as it is advanced by the web-feeding mechanism and step by step means for feeding a web of gold leaf to the impressing mechanism for each impression.

15. In a machine for making cigar-bands, the combination of step-by-step web-feeding mechanism, and intermittent and conjointly operated mechanism for successively impressing sizing and gold-leaf on the web, printing the web in different colors and embossing it, as it is advanced by the web-feeding mechanism and step by step means for feeding a web of gold leaf to the impressing mechanism for each impression.

16. In a machine for making cigar bands, the combination of web-feeding mechanism, intermittent and conjointly operated mechanism for successively applying sizing to the web, for applying gilt to the sized portion of the web and for printing the web, as it is advanced by the web-feeding mechanism, means for feeding gilt to the form for applying the same and means for removing gilt from the unsized portions of the web before it is printed.

17. In a machine for making cigar bands, the combination of step-by-step web-feeding mechanism, intermittent and conjointly operated mechanism for successively applying sizing to the web, for applying gilt to the sized portion of the web and for printing the web, as it is advanced by the web-feeding mechanism, mechanism for feeding a strip of gilt to the applying mechanism, and means for removing gilt from the unsized portions of the web before it is printed.

18. In a machine for making cigar bands, the combination of web-feeding mechanism, intermittent and conjointly operated mechanism for successively applying, impressing sizing and gold-leaf on the web and printing the web, as it is advanced by the web-feeding mechanism, means for intermittently feeding a strip of gold leaf to the impressing mechanism, and means for removing the gold-leaf from the unsized portions of the web before it is printed.

19. In a machine for making cigar bands, the combination of web-feeding mechanism, intermittent and conjointly operated mechanism for successively impressing sizing and gold-leaf on the web, printing and impressing the web, as it is advanced by the web-feeding mechanism, means for intermittently feeding a strip of gold leaf to the impressing mechanism, and means for removing the gold-leaf from the unsized portions of the web before it is printed.

20. In a machine for making cigar bands, the combination of web-feeding mechanism, intermittent and conjointly operated mechanism for successively impressing sizing and gold-leaf on the web, printing the web in different colors and embossing it, as it is advanced by the web-feeding mechanism, means for intermittently feeding a strip of gold leaf to the impressing mechanism, and means for removing the gold-leaf from the unsized portions of the web before it is printed.

21. In a machine for making cigar bands, the combination of step-by-step web-feeding mechanism, intermittent and conjointly operated mechanism for successively applying, impressing the sizing and gold-leaf on the web and printing the web, as it is advanced by the web-feeding mechanism, means for intermittently feeding a strip of gold leaf to the impressing mechanism, and means for removing the gold-leaf from the unsized portions of the web before it is printed.

22. In a machine for making cigar bands, the combination of step-by-step web-feeding mechanism, intermittent and conjointly operated mechanism for successively impressing sizing and gold-leaf on the web, printing and impressing the web, as it is advanced by the web-feeding mechanism, means for intermittently feeding a strip of gold leaf to the impressing mechanism, and means for removing the gold-leaf from the unsized portions of the web before it is printed.

23. In a machine for making cigar bands, the combination of web-feeding mechanism, intermittent and conjointly operated mechanism for successively impressing the gilt on and printing the web, as it is advanced by the web-feeding mechanism, mechanism for cutting the web longitudinally after it has been printed, means for drying the web after it has been impressed and before it is cut.

24. In a machine for making cigar bands, the combination of web-feeding mechanism, intermittent and conjointly operated mechanism for successively applying sizing to the web, for applying gilt to the sized portion of the web and for printing the web, as it is advanced by the web-feeding mechanism, and means for drying the sizing before the web is printed.

25. In a machine for making cigar-bands, the combination of web-feeding mechanism, intermittent and conjointly operated mechanism for successively applying sizing to the web, applying gilt to the sized portions thereof, printing the web, and embossing it, as it is advanced by the web-feeding mechanism, and means for drying the sizing before the web is printed.

26. In a machine for making cigar bands, the combination of step-by-step web-feeding mechanism, intermittent and conjointly operated mechanism for successively applying sizing to the web, for applying gilt to the sized portion of the web and for printing the web, as it is advanced by the web-feeding mechanism, and means for drying the sizing before the web is printed.

27. In a machine for making cigar bands, the combination of step-by-step web-feeding mechanism, intermittent and conjointly operated mechanism for successively applying sizing to the web, applying gilt to the sized portions thereof, printing the web, and embossing it, as it is advanced by the web-feeding mechanism, and means for drying the sizing before the web is printed.

28. In a machine for making cigar bands, the combination of step-by-step web-feeding mechanism, intermittent mechanism for successively printing and embossing the web, as it is advanced by the web-feeding mechanism, means for heating the embossing mechanism, means for drying the web after it has been embossed, and mechanism for cutting the web longitudinally after it has been dried.

29. In a machine for making cigar bands, the combination of step-by-step web-feeding mechanism, means for applying a gilt design on the web, a form for printing the web after the gilt design has been applied, a die for embossing the web, intermittent mechanism for pressing the form and die on the web, and mechanism operating with the embossing die for cutting the web longitudinally around the printed and embossed portions.

30. In a machine for making cigar bands, the combination of step-by-step web-feeding mechanism, intermittent means for applying a gilt design on the web, means for drying the gilt on the web, a series of forms disposed to successively print the web as it is advanced after the gilt has dried, multi-color inking-mechanism for said forms operating transversely to the web, mechanism for pressing the forms on the web, and mechanism for cutting the web longitudinally around the printed portions.

31. In a machine for making cigar bands, the combination of step-by-step web-feeding mechanism, a form for impressing sizing on the web, a form for impressing gold-leaf to the sizing on the web, step by step mechanism for feeding a strip of gold-leaf to the said latter form, a series of forms disposed to successively print the web as it is advanced, intermittent mechanism for conjointly pressing said forms on the web, multi-color inking-mechanism for said series of forms operating transversely to the web, and means operating conjointly with said pressing mechanism, for embossing the web after it has been printed.

32. In a machine for making cigar bands, the combination of step-by-step web-feeding mechanism, a form for applying sizing on the web, a form for applying gold-leaf on the sized portion of the web, step by step means for feeding a strip of gold-leaf to said latter form, means for removing any excess gold-leaf from the web, a form for printing the web, and intermittent mechanism for conjointly pressing all of said forms on the web.

33. In a machine for making cigar bands, the combination of step-by-step web-feeding mechanism, a form for applying sizing on the web, a form for applying gold-leaf on the sized portion of the web, step by step means for feeding a strip of gold-leaf to said latter form, means for removing any excess gold-leaf from the web, a form for printing the web, intermittent mechanism for conjointly pressing all of said forms on the web, and means for embossing the web after it has been printed.

34. In a machine for making cigar bands, the combination of step-by-step web-feeding mechanism, a form for impressing sizing on the web, a form for applying gold-leaf on the sized portion of the web, step by step means for feeding a strip of gold-leaf to said latter form, means for removing any excess gold-leaf from the web, means for drying the gilt impression on the web, a series of forms disposed to successively print on the web, and intermittent mechanism for conjointly impressing all of said forms on the web.

35. In a machine for making cigar bands, the combination of step-by-step web-feeding mechanism, a form for impressing sizing on the web, a form for applying gold-leaf on the sized portion of the web, step by step means for feeding a strip of gold-leaf to said latter form, means for removing any excess gold-leaf from the web, means for drying the gilt impression on the web, a series of forms disposed to successively print on the web, intermittent mechanism for conjointly impressing all of said forms on the web, and means for embossing the web after it has been printed.

36. In a machine for making cigar bands, the combination of step-by-step web-feeding mechanism, intermittent and conjointly operated mechanism for successively applying sizing and gilt to the web printing the web in colors, embossing the web, and for applying a finishing coat to the web after it has been printed.

37. In a machine for making cigar bands, the combination of step-by-step web-feeding mechanism, intermittent and conjointly operated mechanism for successively applying sizing and gilt to the web, printing the web in colors, embossing the web, and for applying a finishing coat to the web after it has been printed, and means for drying the finished web.

38. In a machine for making cigar bands, the combination of step-by-step web-feeding mechanism, mechanism for successively applying sizing and gilt to the web, printing the web in colors, embossing the web, means for applying a finishing coat to the web after it has been printed, means for drying the finished web, and mechanism for cutting the web around the finished bands after it has been dried.

39. In a machine for making cigar bands, the combination of a stationary bed, a reciprocating carriage, a platen and step-by-step web-feeding mechanism on the carriage, forms on the bed for successively applying sizing to and printing the web, means for applying gilt to the sized portions of the web, and means for supplying sizing and ink to said forms, and mechanism for operating the carriage.

40. In a machine for making cigar bands, the combination of a stationary bed, a reciprocating carriage, a platen and step-by-step web-feeding mechanism on the carriage, forms on the bed for successively applying sizing to and printing the web, means for applying gilt to the sized portions of the web, means for supplying sizing and ink to said forms, and mechanism for cutting the web longitudinally around the printed portion.

41. In a machine for making cigar bands, the combination of a stationary bed, a reciprocating carriage, a platen and step-by-step web-feeding mechanism on the carriage, forms on the bed for successively printing the web in different colors, embossing dies on the platen and bed respectively, means for supplying ink to said forms, and mechanism for operating the carriage.

42. In a machine for making cigar bands, the combination of a stationary bed, a reciprocating carriage, a platen and step-by-step web-feeding mechanism on the carriage, forms on the bed for successively printing the web in different colors, embossing-dies on the platen and bed respectively, means for supplying ink to said forms, mechanism for cutting the web longitudinally around the printed and embossed portions, and mechanism for operating the carriage.

43. In a machine for making cigar bands, the combination of a stationary bed, a reciprocating carriage, a platen and step-by-step web-feeding mechanism on the carriage, forms on the bed for successively applying sizing to, and printing the web, means for applying gilt to the sized portions of the web, means for supplying sizing and ink to said forms, embossing-dies on the carriage and the bed respectively, and mechanism for operating the carriage.

44. In a machine for making cigar bands, the combination of a stationary bed, a reciprocating carriage, a platen and step-by-step web-feeding mechanism on the carriage, forms on the bed for successively applying sizing to, and printing the web, means for applying gilt to the sized portions of the web, means for supplying sizing and ink to said forms, embossing-dies on the carriage and the bed respectively, mechanism for cutting the web longitudinally around the printed portion, and mechanism for operating the carriage.

45. In a machine for making cigar bands, the combination of a stationary bed, a reciprocating carriage, a platen and step-by-step web-feeding mechanism on the carriage, forms on the bed for successively applying sizing to, and printing the web, means for applying gilt to the sized portions of the web, means for supplying sizing and ink to said forms, a gilt removing brush on the carriage, and mechanism for operating the carriage.

46. In a machine for making cigar bands, the combination of a stationary bed, a reciprocating carriage, a platen and step-by-step web-feeding mechanism on the carriage, forms on the bed for successively applying sizing to, and printing the web, means for supplying sizing and ink to said forms, a gilt removing brush on the carriage, embossing-dies on the carriage and the bed respectively, and mechanism for operating the carriage.

47. In a machine for making cigar bands, the combination of a stationary bed, a reciprocating carriage, a platen and step-by-step web-feeding mechanism on the carriage, forms on the bed for successively applying sizing to and printing the web, means for applying gilt to the sized portions of the web, means for supplying sizing and ink to said forms, a burnishing roll on the carriage, and mechanism for operating the carriage.

48. In a machine for making cigar bands, the combination of a stationary bed, a reciprocating carriage, a platen and step-by-step web-feeding mechanism on the carriage, forms on the bed for successively applying sizing to, and printing the web, means for applying gilt to the sized portions of the web, means for supplying sizing and ink to said forms, a burnishing roll on the carriage, embossing-dies on the carriage and bed respectively, and mechanism for operating the carriage.

49. In a machine for making cigar bands, the combination of a stationary bed, a reciprocating carriage, a platen and step-by-step web-feeding mechanism on the carriage, forms on the bed for successively applying sizing to, and printing the web, means for applying gilt to the sized portions of the web, means for supplying sizing and ink to said forms, means on the carriage for drying the web after it has been printed, and mechanism for operating the carriage.

50. In a machine for making cigar bands, the combination of a stationary bed, a reciprocating carriage, a platen and step-by-step web-feeding mechanism on the carriage, forms on the bed for successively applying sizing to, and printing the web, means for applying gilt to the sized portions of the web, means for supplying sizing and ink to said forms, means on the carriage for drying the web after it has been printed, embossing-dies on the carriage and bed respectively, and mechanism for operating the carriage.

51. In a machine for making cigar bands, the combination of a stationary bed, a reciprocating carriage, a platen and step-by-step web-feeding mechanism on the carriage, forms on the bed for successively printing the web in different colors, embossing-dies on the platen and bed respectively, means for supplying ink to said forms, means for applying the finishing material to the embossing-dies, and mechanism for operating the carriage.

52. In a machine for making cigar bands, the combination of a stationary bed, a reciprocating carriage, a platen and step-by-step web-feeding mechanism on the carriage, forms on the bed for successively printing the web in different colors, embossing-dies on the platen and bed respectively, means for supplying ink to said forms, mechanism for cutting the web longitudinally around the printed and embossed portions, means for applying the finishing material to the embossing-dies, and mechanism for operating the carriage.

53. In a machine for making cigar bands, the combination of a stationary bed, a reciprocating carriage, a platen and step-by-step web-feeding mechanism on the carriage, forms on the bed for successively printing the web in different colors, embossing-dies on the platen and bed respectively, means for supplying ink to said forms, means for heating one of the embossing-dies on the bed, and mechanism for operating the carriage.

54. In a machine for making cigar bands, the combination of a stationary bed, a reciprocating carriage having a platen thereon, step by step web-feeding mechanism on the carriage, reciprocating mechanism for successively applying gilt to, and printing the web, mechanism for cutting the web longitudinally around the printed portions to leave a strip of connected finished bands when said carriage is reciprocated, and means for winding up the strip.

55. In a machine for making cigar bands, the combination of a stationary bed, a reciprocating carriage having a platen thereon, step by step web-feeding mechanism on the carriage, reciprocating mechanism for successively applying gilt to, and printing the web, means for embossing the web, mechanism for cutting the web longitudinally around the printed portions to leave a strip of connected finished bands when said carriage is reciprocated, and means for winding up the strip.

56. In a machine for making cigar bands, the combination of a stationary bed, a reciprocating carriage, a platen and step-by-step web-feeding mechanism on the carriage, forms on the bed for successively applying gilt to, and printing the web in different colors, means for supplying ink to said forms, and mechanism operated by the carriage, for cutting the web longitudinally around the printed portions to leave a connected strip of finished bands.

57. In a machine for making cigar bands, the combination of a stationary bed, a reciprocating carriage, a platen and step-by-step web-feeding mechanism on the carriage, forms on the bed for successively applying gilt to, and printing the web in different colors, means for supplying ink to said forms, means for embossing the web, and mechanism operated by the carriage, for cutting the web longitudinally around the printed portions to leave a connected strip of finished bands.

58. In a machine for making cigar bands, the combination of a stationary bed, a reciprocating carriage, a platen and step-by-step web-feeding mechanism on the carriage, forms on the bed for successively applying gilt to, and printing the web in different colors, means for supplying ink to said forms, mechanism operated by the carriage, for cutting the web longitudinally around the printed portions to leave a connected strip of finished bands, and means for winding up the strip after it has been cut.

PAUL PIERSON.

Witnesses:
FRED GERLACH,
HILDEN H. PETERSEN.